(12) United States Patent
Flessner et al.

(10) Patent No.: US 10,699,401 B2
(45) Date of Patent: Jun. 30, 2020

(54) METHOD AND SYSTEM FOR DETERMINING THE LOCAL QUALITY OF SURFACE DATA EXTRACTED FROM VOLUME DATE

(71) Applicant: Volume Graphics GmbH, Heidelberg (DE)

(72) Inventors: Matthias Flessner, Erlangen (DE); Tino Hausotte, Erlangen (DE)

(73) Assignee: VOLUME GRAPHICS GMBH, Heidelberg (DE)

( * ) Notice: Subject to any disclaimer, the term of this patent is extended or adjusted under 35 U.S.C. 154(b) by 0 days.

(21) Appl. No.: 15/511,964

(22) PCT Filed: Sep. 17, 2015

(86) PCT No.: PCT/EP2015/071377
§ 371 (c)(1),
(2) Date: Mar. 16, 2017

(87) PCT Pub. No.: WO2016/042105
PCT Pub. Date: Mar. 24, 2016

(65) Prior Publication Data
US 2017/0256048 A1 Sep. 7, 2017

(30) Foreign Application Priority Data

Sep. 17, 2014 (DE) .................. 10 2014 218 691
Jan. 26, 2015 (DE) .................. 10 2015 201 271

(51) Int. Cl.
*G06T 7/00* (2017.01)
*G01N 23/046* (2018.01)
*G06T 19/20* (2011.01)

(52) U.S. Cl.
CPC ......... *G06T 7/0004* (2013.01); *G01N 23/046* (2013.01); *G06T 19/20* (2013.01);
(Continued)

(58) Field of Classification Search
CPC ............ G01N 2223/419; G01N 23/046; G06T 19/20; G06T 2207/10072;
(Continued)

(56) References Cited

U.S. PATENT DOCUMENTS

2007/0238964 A1* 10/2007 John ..................... A61B 6/032
600/407
2012/0321155 A1 12/2012 Li et al.

FOREIGN PATENT DOCUMENTS

CN 102129686 A 7/2011
CN 102920537 A 2/2013
(Continued)

OTHER PUBLICATIONS

Lorensen, William E., Cline, Harvey E., "Marching Cubes: A High Resolution 3D Surface Construction Algorithm," ACM SIGGRAPH Computer Graphics, vol. 21, No. 4, Jul. 1987, pp. 163-169.
(Continued)

*Primary Examiner* — Manuchehr Rahmjoo
(74) *Attorney, Agent, or Firm* — SoCal IP Law Group LLP; Angelo J. Gaz (57) ABSTRACT

The aim of the invention is to determine the local quality of surface data (O) extracted from a volume data set (V) by means of a surface determination method. An environment in the volume data set (V) is determined for each surface point of the surface data (O). Using the curve of the grayscale values of voxels from said environment, at least one quality characteristic (Q) is derived which characterizes the quality of the respective examined surface point. The quality characteristic (Q) or each quality characteristic is output together with coordinates of the respective examined surface point as the method result (O').

10 Claims, 6 Drawing Sheets

(52) U.S. Cl.
CPC .................. *G01N 2223/419* (2013.01); *G06T 2207/10072* (2013.01); *G06T 2207/30136* (2013.01); *G06T 2207/30164* (2013.01)

(58) Field of Classification Search
CPC . G06T 2207/30136; G06T 2207/30164; G06T 7/0004
See application file for complete search history.

(56) References Cited

FOREIGN PATENT DOCUMENTS

| | | |
|---|---|---|
| CN | 103093474 A | 5/2013 |
| CN | 103093474 B | 3/2015 |
| DE | 10 2005 012094 A1 | 9/2006 |
| JP | 2009-165615 A | 7/2009 |
| JP | 2009165615 A | 7/2009 |
| WO | 2012/160511 A1 | 11/2012 |
| WO | 2016/042105 A1 | 3/2016 |

OTHER PUBLICATIONS

European Patent Office, Office Action to European Application No. 15 778 662.9, dated Jul. 11, 2019.

Flessner et al. "Evaluating and visualizing the quality of surface points determined from computed tomography vol. data", Physikalisch-Technische Bundesanstalt, Jan. 1, 2015. 8 pages.

Korean Intellectual Property Office, Non-Final Rejection for Application No: 10-2017-7009550, dated Jun. 26, 2019.

Reda et al., "An artifact-robust, shape library-based algorithm for automatic segmentation of inner ear anatomy in post-cochlear-implantation CT," SPIE Medical Imaging, 2014. 22 pages.

Flessner, Matthias et al. "Evaluating and visualizing the quality of surface points determined from computed tomography volume data", https://oar.ptb.de/resources/show/10.7795/810.20150223A, accessed Jun. 28, 2019.

Chinese National Intellectual Property Administration, First Notification of Office Action for Chinese Patent Application No. 201580050189.8, dated Aug. 5, 2019.

Chinese National Intellectual Property Administration, Search Report for Chinese Patent Application No. 201580050189.8, dated Jul. 28, 2019.

Fitsum A. Redaa "An artifact—robust shape library-based algorithm for automatic segmentation of inner ear anatomy in post-cochlear-implantation CT", SPIE—International Society for Optical Engineering, vol. 9024, published Mar. 21, 2014.

Canadian Intellectual Property Office, Office Action for Canadian Application No. 2,961,701, dated Nov. 25, 2019. 4 pages.

\* cited by examiner

METHOD AND SYSTEM FOR DETERMINING THE LOCAL QUALITY OF SURFACE DATA EXTRACTED FROM VOLUME DATE

The invention relates to a method for determining the local quality of surface data which are extracted from obtained volume data (in particular volume data obtained by computed tomography). The invention further relates to a system for carrying out the method.

Industrial x-ray computed tomography facilitates ascertaining a technical object (including inner structures) in a nondestructive and contactless manner. Here, the object is irradiated by x-ray radiation from different directions, with 2D projections of the object being recorded in each case. A 3D image data record (volume data record) is reconstructed from the 2D projections. Such a volume data record consists of a three-dimensional matrix of voxels (cuboid-shaped volume elements), with a grayscale value being assigned to each voxel. This grayscale value represents the local x-ray absorption coefficient of the object at the spatial point assigned to the volume element.

Corresponding volume data records are also produced by means of other tomographic methods, e.g. by means of magnetic resonance imaging or ultrasound tomography.

For the purposes of visualizing and examining the recorded volume, two-dimensional slice images are derived, as a rule, from the three-dimensional image information (i.e. the spatial distribution of the grayscale values) of the volume data record and displayed on a screen. However, it may be desirable to determine the surface of the imaged object from the volume data for the purposes of an improved visualization or any other type of further processing of the data (e.g. for use in dimensional metrology, an intended/actual comparison with CAD data, a defect analysis or as an input for a FEM simulation). Here, the surface is given by the ensemble of those spatial points which define the interface between the material-filled spatial volume of the object and the empty or air-filled surroundings, or the interface between partial volumes of different materials. In the case of complex objects, the surface to be determined may consist of a plurality of partial areas, connected or unconnected to one another, and thus e.g. comprise one or more inner areas and/or material boundaries in addition to an external area.

There are various (surface determination) methods known per se, by means of which this surface may be determined from a volume data record, for example:
- the so-called "marching cubes" algorithm (iso-surface), as described in e.g. William E. Lorensen, Harvey E. Cline: "Marching Cubes: A High Resolution 3D Surface Construction Algorithm". In: Computer Graphics, volume 21, number 4, July 1987,
- the use of a locally adaptive threshold, as described in e.g. EP 1 861 822 A1, or
- the so-called "3D Otsu's thresholding" algorithm, as described in e.g. Nobuyuki Otsu: "A Threshold Selection Method from Gray-Level Histograms". In: IEEE TRANSACTIONS ON SYSTEMS, MAN, AND CYBERNETICS, VOL. SMC-9, NO. 1, JANUARY 1979.

In part, these methods operate iteratively, i.e. they start with a rough estimate for the surface to be determined and refine this estimate iteratively to a surface which is as correct as possible.

In the case of volume data produced by computed tomography, the surface of the recorded object separates a spatial region which absorbs radiation to a greater extent ("high-absorbing region") from a spatial region absorbing radiation to a lesser extent ("low-absorbing region") in any case (i.e. independently of whether the surface delimits a material-filled spatial region from an air-filled space or space without air, or whether two different materials are delimited from one another).

In the volume data, this transition is always expressed as a more or less sharp, areal contrast. In other words, the surface to be determined in the volume data is distinguished by the voxels along the surface to be determined having no, or only a comparatively low, spatial grayscale value fluctuation while the grayscale values of the voxels are subject to a comparatively strong spatial change in the neighborhood of each spatial point of the surface perpendicular to the areal extent thereof (i.e. in a direction normal to the surface).

This also applies to volume data which are generated by means of other tomographic methods, even if the spatial grayscale value fluctuation of the voxels of such volume data records is in part not immediately based on a varying energy absorption due to the materials. By way of example, the grayscale value contrast of volume data produced by magnetic resonance imaging is typically based on locally varying relaxation times of previously excited nuclear spin states. However, surfaces of the recorded object are also expressed here in areal grayscale value contrasts in the volume data.

Figure 3:
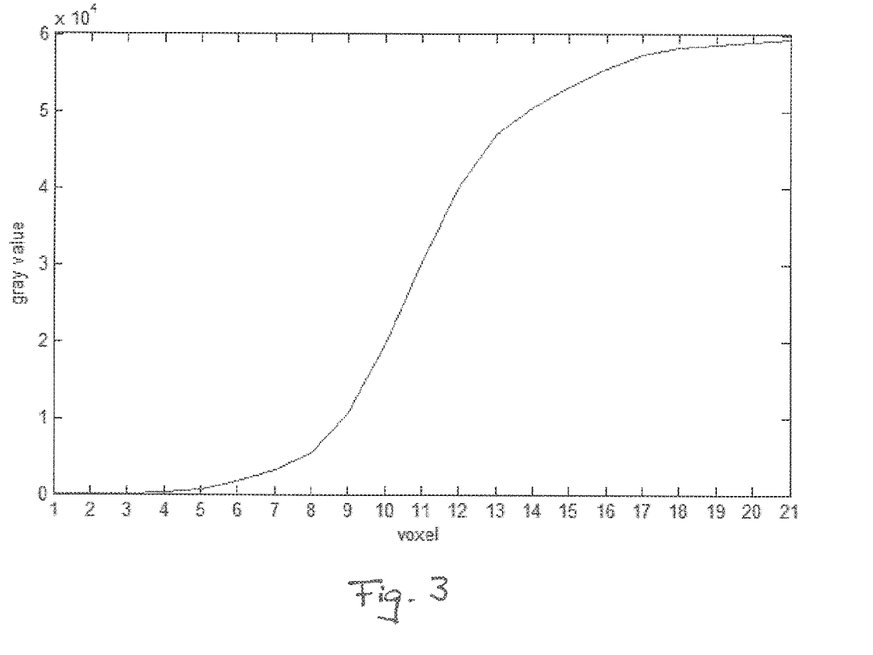
FIG. 3 shows a schematic diagram of a grayscale value profile along a search beam within a volume data record produced by computed tomography.

On account of the restricted spatial resolution of industrial tomographic methods, in particular industrial computed tomography, the surface of the measured object is regularly expressed here in a soft or blurred transition (i.e. a spatially continuous transition extending over a plurality of adjoining voxels in the normal direction) from low grayscale values (corresponding to the low-absorbing region) to high grayscale values (corresponding to the high-absorbing region), or vice versa. FIG. 3 depicts, in an exemplary manner, a grayscale value curve (also referred to as a grayscale value profile) of a volume data record produced by computed tomography, as typically emerges perpendicular to a surface where materials such as e.g. plastic on the one hand and air on the other hand adjoin one another at the recorded object.

Even though the grayscale value transition in the volume data caused by the surface of the recorded object is therefore not sharp (even if the surface of the actual measured object in fact has a sharp boundary), conventional methods for determining the surface would often, as a matter of principle, facilitate determining the spatial position of the surface with an accuracy smaller than the edge length of a voxel.

Figure 4:
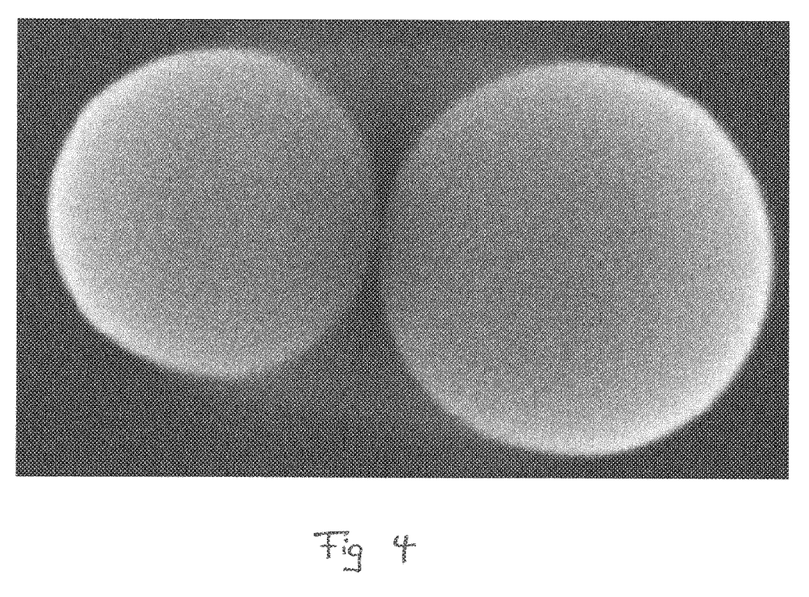
FIG. 4 shows a slice image of a volume data record of an object produced by computed tomography, said object being formed by two steel spheres abutting against one another.

However, various artifacts which lead to a deterioration in the volume data (e.g. beam hardening artifacts, stripe artifacts, scattered radiation artifacts, ring artifacts) and therefore limit the precision of determining the surface regularly occur in industrial computed tomography, just like in other tomographic methods. As a result, in a manner deviating from the actual geometry of the object, the grayscale values in the volume data are falsified. By way of example, FIG. 4 shows a slice image of an artifact-afflicted volume data record of an object produced by computed tomography, said object being formed by two steel spheres lying close together. Voxels with low grayscale values (and low x-ray absorption coefficients) are depicted here as black or dark colored spots in an exemplary manner, whereas voxels with high grayscale values (and high x-ray absorption coefficients) are depicted as bright to white colored spots. The brighter regions between the images of the two spheres which are identifiable in the illustration are caused by artifacts from the image reconstructions in this case. Therefore, these brighter regions are not caused by the recorded object, but only by the image reconstructions. Moreover, on account of the cupping effect (triggered by beam hardening), the grayscale values are systematically underestimated between the spheres. For this reason, it appears as if there is a small distance between the sphere surfaces, even though they in fact are in contact at a point.

Finding the surface is made more difficult by artifacts in the volume data. Thus, the surfaces from artifact-afflicted volume data are regularly calculated in a falsified manner in part with significant falsification. In particular, surface regions of the real object are sometimes not identified on account of artifacts in the volume data. It may likewise occur that surface regions which the real object in fact does not have, such as e.g. the aforementioned brighter areas between the sphere areas, are detected on account of artifacts in the volume data.

The invention is based on the object of specifying a method and a system which may be used to effectively determine the local quality of surface data which are extracted from a volume data record by means of a surface determination method.

In respect of a method, this object is achieved, according to the invention, by the features of claim 1. In respect of a system, this object is achieved, according to the invention, by the features of claim 10. Advantageous configurations and developments of the invention, which each, in part, are inventive on their own, are presented in the dependent claims and in the subsequent description.

The method according to the invention serves to determine the local quality of surface data extracted from a volume data record by means of a surface determination method.

As is conventional, the volume data record comprises a three-dimensional matrix of voxels which each have a grayscale value assigned thereto. The surface data comprise a number of surface points extracted from the volume data record. Here, the surface data extracted from the volume data record are, in particular, combined in a surface data record which, for example, is available in the so-called STL format. In this data format, the individual surface points are pooled as corners of triangular facets, from which the surface—ideally a completely closed surface—is composed. Here, the 3D coordinates of the corners and the direction of the normal vector which is perpendicular to the respective triangular facet are stored for each triangular facet. Here, the orientation of the normal vector specifies which side of the triangular facet is directed "inward" and "outward", respectively.

In general, at least one quality characteristic which characterizes the quality of the respectively considered surface point is determined in each case, within the scope of the method according to the invention, for the surface points extracted from the volume data record. In general, the "quality" of the respective surface point (local quality) is represented by a variable, which directly or indirectly comprises an information about how accurate an extracted surface point from the volume data record reproduces the actual surface of the recorded object.

Figure 7:
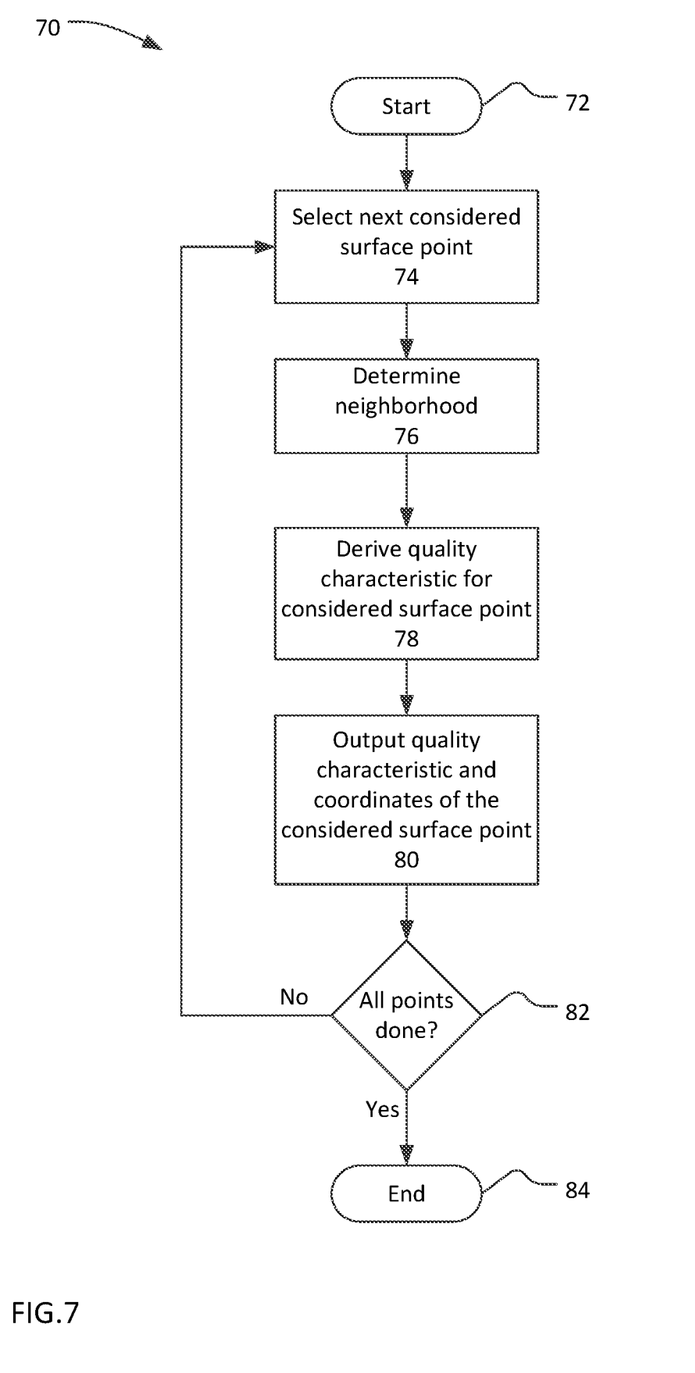
FIG. 7 shows a schematic flowchart of a method for determining quality characteristics of surface points.

Here, the procedure described below is carried out in a cyclical manner for each of these surface points. FIG. 7 is a flow chart of a process 70 for determining quality characteristic(s) for surface points. The process 70 begins at 72 and ends at 84. At 74, the surface point to which the respective method cycle relates, i.e. for which the at least one quality characteristic is obtained in the relevant method cycle, is selected. The selected surface point is denoted as "considered surface point" here in order to distinguish it from the respective other surface points.

At 76, a neighborhood in the volume data is determined for the respectively considered surface point according to predetermined criteria in each method cycle. Here, the neighborhood is formed by a group of voxels of the volume data record in the vicinity of the reference point of the volume data record corresponding to the considered surface point with regard to the 3D coordinates thereof. As a rule, this reference point does not exactly correspond to the coordinates of one voxel but usually lies between a plurality of voxels.

At 78, the at least one quality characteristic is derived on the basis of the curve, in particular on the basis of the spatial variation, of the grayscale values of voxels from this neighborhood. The quality characteristic, or each quality characteristic, ascertained thus is output at 80 together with the coordinates of the considered surface point as result of the method. In particular, the surface points together with the associated quality characteristic, or each respectively associated quality characteristic, are stored in a modified surface data record, which is also referred to as "qualified surface data record" below. The value of the quality characteristics preferably increases as the quality of the associated surface point improves. However, alternatively, the quality characteristics may also be defined in such a way that they specify the quality of the associated surface point in an inverse fashion (i.e. the magnitude increases as the quality of the associated surface point deteriorates). In the latter case, the quality characteristics are defined, in particular, as individual point uncertainties (which specify the spatial error of a surface point in a specific unit of length, e.g. in millimeters). At 82, a decision is made whether or not the actions from 74 to 80 should be repeated for additional surface points.

Thus, according to the invention, the information items from the volume data are used in the neighborhood of an already extracted surface point—in particular extracted by means of one of the aforementioned methods for determining the surface—to estimate the quality of said surface point. This is carried out for all extracted surface points. The result of this are surface points which contain not only information about the coordinates in x, y and z of the respective surface point but also, additionally, one or more quality characteristics which characterize the quality (i.e. precision or reliability) of the respectively extracted surface point.

The quality characteristics are preferably calculated taking into account one or more of the criteria described below:
A search beam is determined as neighborhood of the considered surface point, said search beam intersecting the surface ascertained from the surface points at right angles (or deviating therefrom up to a certain angle). The criteria described below are determined by evaluating the grayscale value profile formed by voxels along said search beam (possibly interpolated from a plurality of voxels):

Assessing the Sharpness of the Grayscale Value Profile

Here, in an expedient embodiment, the quality of the surface point is evaluated to be higher, the more sharply pronounced the transition of the grayscale value profile is from high to low values, in particular the greater the gradient of the grayscale value profile is at the location of the surface point. To this end, a measure for the gradient of the grayscale value profile is preferably determined as a criterion for the quality of the respectively considered surface point along the search beam. In particular, this measure is determined by fitting the grayscale value profile using a stored reference profile. Here, an error function or, if the derivative of the grayscale values along the search beam is considered, a Gaussian curve is stored, for example, as a reference profile (profile to be expected), with the respective function being fitted to the best possible extent to the ascertained grayscale value profile by adjusting the parameters thereof. In this case, the measure for the gradient is determined from at least one parameter of the fitted reference profile (e.g. the maximum of the possibly fitted Gaussian function). The gradient is optionally considered in relation to the contrast of the grayscale value profile, i.e., in particular, divided by the contrast (i.e. the grayscale value difference between the low-absorbing region and the high-absorbing region). In order to prevent ascertaining of the quality characteristic from being falsified by an abnormally influenced gradient (e.g. influenced by noise or artifacts), the ascertained gradient is preferably related to the noise component (signal-to-noise ratio) and/or to the monotonic property of the grayscale value profile when calculating the quality characteristic. Alternatively, the width of the Gaussian curve fitted to the spatial derivative of the grayscale value profile is used as a measure for the sharpness of the grayscale value profile.

Assessment of the Contrast of the Grayscale Value Profile

To this end, a measure for the contrast of the grayscale value profile is determined as a criterion for the quality of the considered surface point along the search beam. In particular, the two sides of the grayscale value profile divided by the surface point (corresponding to the low-absorbing region and the high-absorbing region) are compared to one another—e.g. by comparing mean values or asymptotic limit values—for the purposes of calculating the contrast. Thus, for example, the mean value of the part of the grayscale value profile lying to the right of the surface point is compared to the mean value of the part of the grayscale value profile lying to the left of the surface point, with e.g. the difference of these mean values—to the right and to the left—being used as a measure for the contrast. Optionally, a region of the grayscale value profile around the extracted surface point remains unconsidered when forming the average. In an expedient embodiment, the quality of the surface point is evaluated to be higher, the greater the ascertained contrast is. In a refined variant of the method, the quality of the surface point is evaluated to be higher, the better the ascertained contrast corresponds to a predetermined intended value. When calculating the quality characteristic, the ascertained contrast is optionally related to the noise component of the grayscale value profile (once again corresponding to a signal-to-noise ratio).

Assessment of the Noise of the Grayscale Value Profile

To this end, a measure for the noise of the grayscale value profile is determined as a criterion for the quality of the considered surface point along the search beam. Here, in various configuration variants of the invention, the noise is ascertained either over the whole grayscale value profile or only on one side of the grayscale value profile divided by the surface point (i.e., only in the low-absorbing region or only in the high-absorbing region of the grayscale value profile). In a development of this configuration, the noise of the grayscale value profile is determined separately in each case for the low-absorbing region and for the high-absorbing region of the grayscale value profile, with the noise values ascertained thus being compared to one another and/or to respectively assigned intended values. This is expedient, particularly on account of the fact that the noise component is regularly pronounced to a different extent in the low-absorbing region and in the high-absorbing region of the grayscale value profiles extracted from the volume data. Thus, the grayscale value profiles—measured in absolute values of the grayscale values—regularly have a lower noise component in the low-absorbing region than in the high-absorbing region. By contrast, considered relatively—i.e. considering the respective noise amplitude in relation to the locally averaged absolute value of the grayscale values—the grayscale value profiles usually have a higher noise component in the low-absorbing region than in the high-absorbing region.

Assessment of the Deviation of the Grayscale Value Profile From a Stored Reference Profile Here, an error function or, if the derivative of the grayscale values along the search beam is considered, a Gaussian curve is once again stored, for example, as a reference profile, with the respective function optionally initially being fitted to the best possible extent to the ascertained grayscale value profile by adjusting the parameters thereof. By way of example, the sum or the mean value of the squared deviations of the individual values of the ascertained grayscale value profile from corresponding values of the reference profile are used as measure for the deviation. In an expedient embodiment, the quality of the surface point is evaluated to be higher in this case, the less the grayscale value profile deviates from the reference profile.

Assessment of the Symmetry of the Grayscale Value Profile

Here, in an expedient embodiment, the quality of the surface point is evaluated to be higher, the more symmetric the grayscale value profile is in respect of the location of the extracted surface point. By way of example, the mean value of the squared deviations of the individual values of the ascertained grayscale value profile from corresponding values of the grayscale value profile mirrored at the reference voxel or the profile turning point as point of symmetry is used as measure for the symmetry of the grayscale value profile.

Assessment of the Monotonic Property of the Grayscale Value Profile

To this end, a measure for the monotonic property (i.e. the uniformity of the gradient) of the grayscale value profile is determined as a criterion for the quality of the considered surface point along the search beam. Here, in an expedient embodiment, the quality of the surface point is evaluated to be higher, the less the grayscale value profile deviates from the monotonic (i.e. only decreasing or increasing) curve of the grayscale values. Optionally, the assessment of the monotonic property is restricted to a predetermined range of the grayscale value profile around the extracted surface point, and so it is not the entire grayscale value profile which is considered to this end.

Assessment of the Distance of the Extracted, Considered Surface Point (Which Was Extracted by Means of a Given Surface Determination Method) From (At Least) One Alternative Surface Point (Alternative Point) Extracted Along the Search Beam By Means of Another Surface Determination Method Here, in an expedient embodiment, the quality of the considered surface point is evaluated to be higher, the less distance there is between the surface points determined by means of various methods. Here, determining the surface points (assigned to the common search beam) is preferably part of the method according to the invention. As an alternative thereto, externally ascertained surface points are used as input variable for the method according to the invention such that, in this case, determining the surface points by means of the plurality of methods itself is not part of the method according to the invention. The methods used to determine the surface points may optionally use local and global thresholds.

Optionally, a plurality of search beams are determined for each considered surface point instead of a single search beam, said plurality of search beams being perpendicular to the surface ascertained from the surface points (or deviating therefrom up to a certain angle). In this case, the criteria described above are ascertained from the grayscale value profiles (optionally interpolated from a plurality of voxels) along this plurality of search beams.

A slice plane extending along the surface ascertained from the surface points is determined as neighborhood of the considered surface point. The criteria described below are determined by evaluating the grayscale value profile of voxels from this slice plane (optionally interpolated from a plurality of voxels):

Assessment of the Noise

To this end, a measure for the noise of the grayscale value profile within the slice plane is determined as a criterion for the quality of the considered surface point. Here, in an expedient embodiment, the quality of the surface point is evaluated to be higher, the lower the noise is or the more homogeneous the grayscale values are within the slice plane. Preferably, only a region of the slice plane surrounding the considered surface point is evaluated in this case. Therefore, noise components from regions of the slice plane lying outside of this region are preferably not taken into account.

Assessment of the Homogeneity of the Grayscale Values

To this end, a measure for the homogeneity of the grayscale value profile within the slice plane is determined as a criterion for the quality of the considered surface point. Here, in an expedient embodiment, the quality of the surface point is evaluated to be higher, the more homogeneous the grayscale values are within the slice plane and therefore the less these grayscale values fluctuate (i.e. vary in space). This is based on the discovery that a pronounced gradient of the grayscale values within the slice plane would indicate an edge of the object where, empirically, relatively large deviations of the extracted points are to be expected. Here too, preferably only a region of the slice plane surrounding the considered surface point is evaluated. Therefore, grayscale values of regions of the slice plane lying outside of this neighborhood are not taken into account. In order to suppress noise components to the greatest possible extent when determining the homogeneity, the grayscale values considered within the slice plane are optionally spatially smoothed before calculating the aforementioned measure.

The aforementioned slice plane is a tangential plane placed at the considered surface point. In an alternative embodiment of the invention, a curved tangential area (in particular with the shape of a spherical shell, the shape of an ellipsoid or—especially in the region of edges—the shape of a lateral cylindrical face) is selected around the reference voxel as a neighborhood instead of a plane tangential area. In once again different embodiment variants of the invention, a spherical or cylindrical volume is selected as a neighborhood around the reference voxel. In these variants too, a measure for the homogeneity and/or a measure for the noise of the grayscale values in the respective neighborhood is/are preferably used as a criterion for calculating the quality characteristics.

Each of the above-described criteria may be used individually (in isolated fashion) for calculating the quality characteristics within the scope of the invention. Here, a plurality of quality characteristics may be assigned to each extracted surface point within the scope of the invention, said quality characteristics each having been ascertained taking into account one criterion. However, the quality characteristic, or each quality characteristic, of each surface point is preferably ascertained taking into account a combination of a plurality of the criteria described above, for example as a weighted sum of individual numbers, which were respectively ascertained using a single criterion.

In order to save computational time, the quality characteristics are determined during (in parallel with) the surface determination in an advantageous configuration of the method. In this case, determining the surface points (by means of one or more different surface determination methods) is a constituent of the method according to the invention and the assigned system. In an alternative embodiment of the invention, the quality characteristics are calculated temporally after the determination of the surface. In this case, determining the surface points (by means of one or more different methods) may likewise be a constituent of the method according to the invention and the assigned system. Alternatively, the method according to the invention and the associated system may be restricted to calculating the quality characteristics in the latter case. In this case, the method also uses surface data as input variables in addition to the volume data of the object, said surface data being derived from these volume data by means of one or more external algorithms.

In a development of the invention, the surface data provided with the quality characteristics are converted into a modified data record which is prepared for display on a screen or in a printout by virtue of modified color values being calculated for the surface points and being assigned to the surface points, taking into account the quality characteristics. When calculating these color values, the grayscale values of the original volume data, in addition to the quality characteristics, are preferably also taken into account. By way of example, the hue of each surface point (e.g. the ratio of the basic colors red, green and yellow) is determined by the quality characteristic in accordance with a predetermined color code—while the color brightness is determined by the original grayscale value. In other words, the original grayscale values are colored differently, depending on the quality of the surface determination. In an alternative embodiment of the invention, the color brightness in a 3D visualization (scene) of the volume data record is determined by volume rendering (i.e. by a light-shadow representation simulating an illumination situation).

Figure 5:
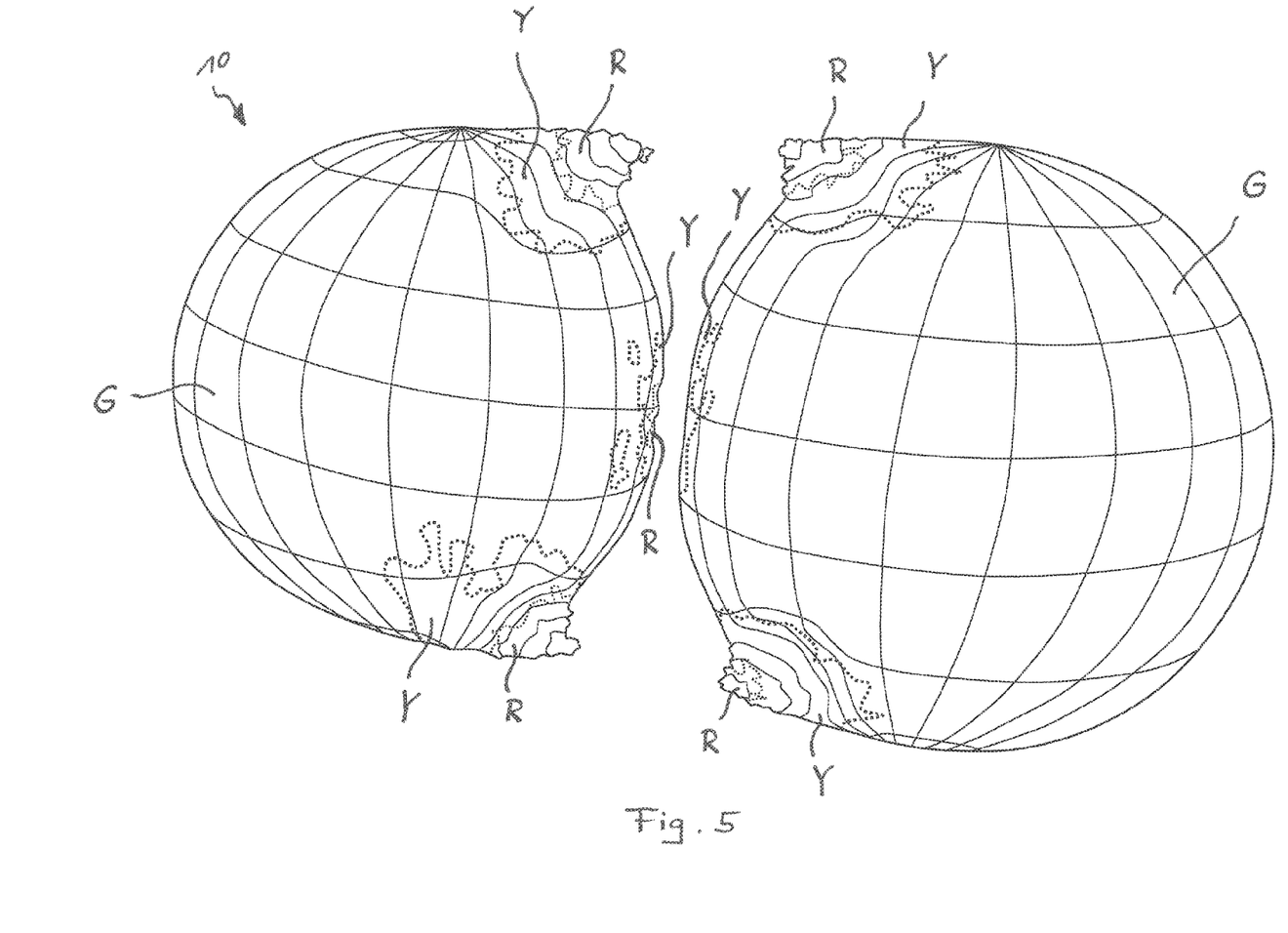
FIG. 5 shows, in a three-dimensional visualization, a surface data record derived from the volume data record in accordance with FIG. 4, the surface points of said surface data record being colored differently according to the stipulation of the respective quality thereof.

Preferably, the quality characteristic is only mapped to different hues with few gradations. Thus, in particular, the quality characteristic, as indicated in FIG. 5, is mapped onto the three hues G (green, corresponding to a good quality characteristic, i.e. a quality characteristic exceeding an upper threshold), Y (yellow, corresponding to an average quality characteristic, i.e. a quality characteristic lying between the upper threshold and a lower threshold) and R (red, corresponding to a poor quality characteristic, i.e. a quality characteristic dropping below a lower threshold) in accordance with a three-level color code.

On the basis of the color values obtained thus, the extracted surface is depicted as a slice image or rendered 3D visualization (scene) using false colors which reflect the precision or the reliability of the individual surface points. In this respect, FIG. 4 shows a representation of a surface data record derived from the volume data record in accordance with FIG. 4, in which the deformations (referred to below as "horns") of the sphere surfaces which are caused by artifacts are highlighted by yellow and red coloring as regions of lower quality.

This facilitates the provision of a clear illustration relating to which regions of the surface extraction may be trusted and which regions are expected to have relatively large deviations. In this example, the surface points influenced by artifacts were reliably identified. This is of greatest relevance for the industrial application of CT as the validity of the data obtained by CT is often still questioned.

Additionally, the step back to the volume data may be undertaken in order to assess the voxels in the neighborhood of the surface points marked as poor as being afflicted by artifacts.

In a further development of the invention, one or more geometric elements are fitted to the surface data provided with the quality characteristics (or to a selected part of said surface data) by means of an optimization method (e.g. by means of the Levenberg-Marquardt algorithm) in a subsequent method step. Here, geometric elements denote mathematical functions which are parameterizable in respect of position, orientation, size, etc. and which respectively describe a predetermined geometry, e.g. a point, a line, a circle, a plane, a sphere, a cylinder, a circular cone or a torus. Here, the geometric elements are selected in such a way that they correspond, or come close to, the geometry of the real object (or a drawing, a CAD model or a specification of the object) in the totality thereof or in a volume portion. Thus, for example, two spherical geometric elements are expediently fitted to the surface data record in accordance with FIG. 4, which represents the object of the volume data record in accordance with FIG. 4 consisting of two metal spheres.

In order to avoid interference influences from errors in the surface data record caused by artifacts (the "horns" caused by artifacts in the case of the surface data record in accordance with FIG. 4) on the fitting, or in order to at least keep these as low as possible, the quality characteristics assigned to the surface data are additionally taken into account during the fitting by virtue of surface points evaluated as being inaccurate either being completely neglected or being weighted less. This facilitates a particularly exact fitting of the geometric elements, which is of utmost importance in dimensional metrology.

As an alternative hereto, the surface data are fitted to at least one geometric element by an affine coordinate transformation (in particular a rotation, displacement and/or scaling). In this manner, the surface data and, optionally, the underlying volume data record as well are fitted to e.g. a CAD model of the object imaged in the volume data record. Moreover, the measurement data may thus be aligned in respect of a desired coordinate system in order subsequently to be able to carry out the measurements at clearly defined positions. In the coordinate transformation of the surface data, the previously ascertained quality characteristics are advantageously taken into account as described above (namely, in particular, by inaccurate surface points being completely neglected or weighted less).

It is to be expected that other measurement points also have a relatively large uncertainty in the direct neighborhood of a surface point with a low quality characteristic, even if said other measurement points have good quality characteristics. For this reason, a smoothing filter is applied to the quality characteristics in an advantageous embodiment of the invention such that the originally calculated quality characteristics of the neighboring measurement points are also included.

Additionally, or alternatively, a safety distance, within which no further measurement points are taken into account, is set up around a surface point with a low quality characteristic in an expedient configuration of the invention.

On the other hand, fitting geometric elements to the measurement data may lead to unstable results if too many surface points are discarded from a certain region on account of quality characteristics which are too poor. By way of example, if only points from the region of a small circle segment are taken into account when fitting a circle to the measurement points (because strong artifacts occur in the remaining region), the fitting of the circle parameters (namely the coordinates of the center point and the radius of the circle) is empirically afflicted by comparatively large uncertainties. It is for this reason that, in a preferred configuration of the invention, the weightings of neighboring surface points are also taken into account when calculating the weighting factor of an individual surface point. In this way, measurement points may be preferably treated despite poor quality characteristics if very few measurement points with good quality characteristics are present in the relatively close neighborhood.

In another alternative to fitting at least one geometric element to the surface data or fitting the surface data to at least one geometric object, provision is finally made for a surface data record to be fitted to another surface data record (data fusion) taking into account the assigned quality characteristics. Thus, for example, a plurality of measurements of an object may be carried out with different recording parameters, with, in each case, a measurement having more accurate measurement results for a certain region of the object. The advantages of the individual measurements are combined (or, expressed differently, the disadvantages of a measurement are compensated for) by fusing the data records.

Here, the quality characteristics may be used in two different ways:

When calculating the alignment of the data records in relation to one another (translation and rotation of the coordinate system), it is predominantly those points which are taken into account which, where possible, have a high quality in all measurements. This achieves a more accurate alignment.

After the data records were aligned in relation to one another, a decision has to be made in relation to at which places the measurement points of the individual measurements are incorporated in the final result. For regions in which only one measurement has a high local quality, it is expedient if the surface information items of this measurement are adopted. If a plurality of measurements have a comparable local quality in this region, a mean value (or a weighted mean value) from the surface information items of the individual measurements is expediently determined and used.

In a further development of the invention, an uncertainty or an uncertain contribution is estimated for each individual surface point from the quality characteristics, from which uncertainty or uncertain contribution the object-specific measurement uncertainty may subsequently be estimated.

In a further development of the invention, the quality characteristics are used to determine the ideal recording parameters for a measurement or measurement series. On account of the complexity thereof, computed tomography is a measurement method in which the measurement results are very strongly dependent on the experience of the user. The orientation of the object to be measured in the CT and the selected recording parameters (in particular x-ray voltage, prefiltering of the x-rays and the angular increments when recording the projection images), inter alia, are important influencing factors which are currently largely set by the experience of the user. In order to be able to carry out an optimization of one or more of these influencing factors largely without operator assistance, it is necessary to assess the quality of the individual projection data records as objectively and with as much automation as possible, for the purposes of which the required information is supplied by the method according to the invention. Determining an optimized orientation of the object to be measured or determining optimized recording parameters is carried out within the scope of the invention by way of, in particular, test measurements of the component to be measured really being carried out or simulated with different orientation or varying recording parameters. In order to be able to determine the optimized orientation or the optimized recording parameters, a decision is then made in respect of which variation of the orientation or recording parameters supplies the most promising result. To this end, use is made of the information about the quality of the individual surface points. For which regions or features to be measured of the object the orientation or recording parameters is/are intended to be optimized is defined for the optimization process in this case. Subsequently, all parameters are optimized with the goal of the volume or the surface having a good quality in respect of the metrological evaluation of the data, especially in these regions. Artifacts occurring in regions that are not of interest may therefore be accepted if they do not have a negative influence on the actual dimensional measurements.

Recording parameters to be optimized are, in particular, the acceleration voltage of the x-ray tube, the prefiltering of the x-ray radiation, the orientation of the component on the rotary table, the number and distribution of the angular increments and the size of the x-ray spot.

In a further development of the invention, the quality characteristics are used as an input in the case of iteratively operating surface extraction algorithms. By way of example, the length of the search beam is lengthened in the case of surface points evaluated as poor in order to find the correct position as exactly as possible. By contrast, the search beam is shortened at surface points evaluated as good in order to save computational time. Alternatively, or additionally, the quality characteristic is preferably used for the individual surface points as an abort criterion during the iterative finding of the surface. This facilitates a larger number of iterations in artifact-afflicted regions, without excessively lengthening the computational time.

The ascertained quality characteristics of the surface points may likewise be used to compare the quality or uncertainty of various measurements in relation to one another. The ascertained quality characteristics of the surface points may likewise be used to compare the capability of various extraction algorithms in relation to one another or optimize the parameters of an algorithm.

All mentioned applications require no reference measurements and no a priori knowledge, for example from CAD data, and are also performable for hidden geometries for which reference measurements are not possible or only performable with much outlay.

In principle, the invention is applicable for all volume data or tomographic data and therefore not restricted to x-ray computed tomography only. Further conceivable fields of application are e.g. magnetic resonance imaging and ultrasound tomography.

In an expedient embodiment, the system according to the invention is formed by a computer program (software) configured to carry out the method according to the invention such that this method is carried out automatically when the computer program is run on a computer. Here, embodiments of the system according to the invention are, furthermore, a machine-readable data medium (e.g. a CD-ROM or hard disk drive), on which the aforementioned computer program is stored, and a computer on which the computer program is installed in executable fashion.

The computer program implementing the method according to the invention may, within the scope of the invention, be an independent software application which is executable in isolation, e.g. on a personal computer. Alternatively, the computer program implementing the method according to the invention may, however, also be embodied as a component, in particular as a software module, which may be retrofitted, of the control and evaluation software of a tomography scanner, in particular of an industrial computed tomography scanner.

A special embodiment of the system according to the invention is therefore a tomography scanner, in particular an industrial computed tomography scanner, comprising control and evaluation software implementing the method according to the invention.

Below, exemplary embodiments of the invention are explained on the basis of a drawing. In the drawing.

Parts, dimensions and structures corresponding to one another are always provided with the same reference signs in all figures.

Figure 1:
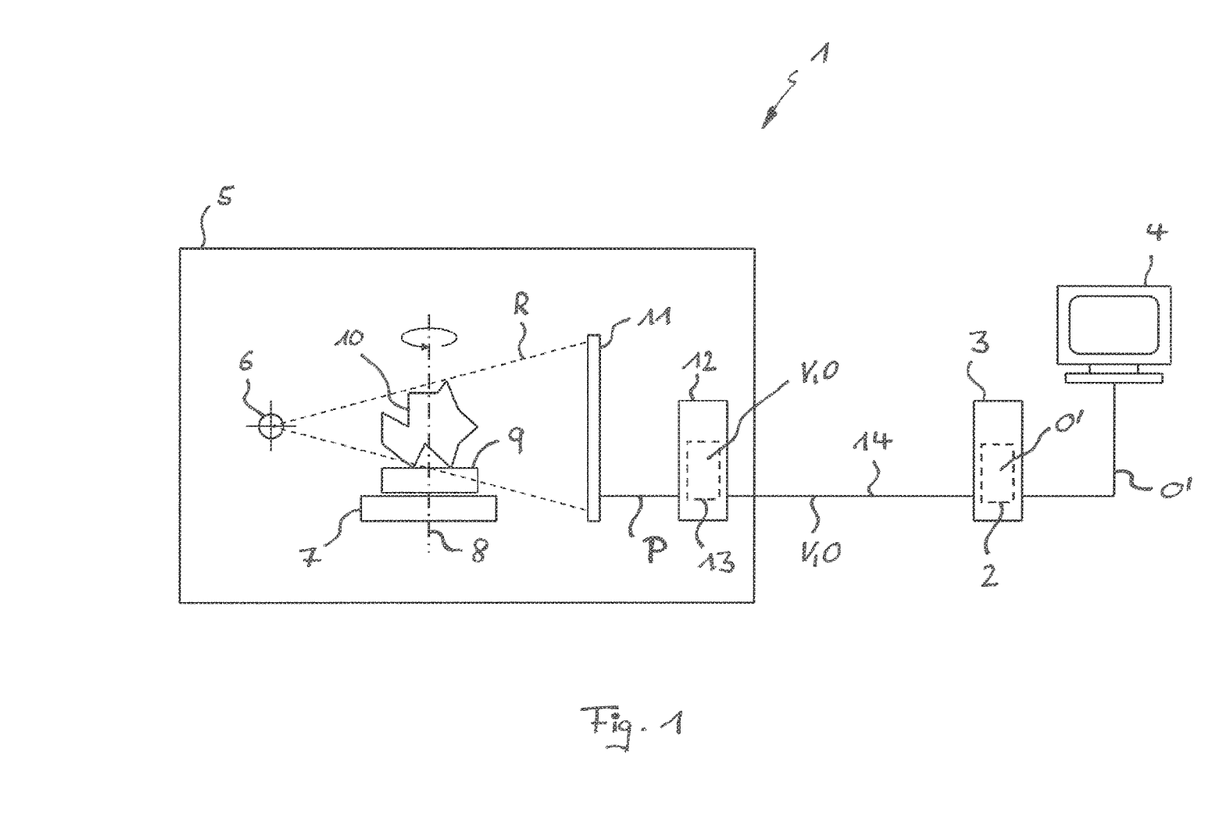
FIG. 1 shows a schematic illustration of a system for determining the local quality of surface data extracted from volume data.

FIG. 1 shows, in a very schematic simplification, a system 1 for determining the quality of surface data extracted from volume data.

The core element of the system 1 is a computer program 2. In the illustration in accordance with FIG. 1, the computer program 2 is installed in executable fashion in a work computer 3. By way of example, the work computer 3 is a conventional personal computer (PC), which is equipped in conventional fashion with input and output means, in particular a screen 4. Here, the work computer 3 and the screen 4 likewise represent constituents of the system 1 in a broader sense.

Further, an industrial computed tomography scanner 5 is an optional component of the system 1. As is conventional, the computed tomography scanner 5 comprises an x-ray source 6, a rotary table 7 with a rotary plate 9, which is rotatable about an axis 8, for rotatably bearing an object 10, indicated in an exemplary manner in FIG. 1, a planar x-ray detector 11 and an evaluation computer 12, on which control software 13 is installed in executable fashion.

The work computer 3 and the computed tomography scanner 5 are connected directly or indirectly for data transfer by way of a data transfer path 14. The data transfer path 14 is, in particular, a—wired or wireless—data transfer network, for example a LAN (local area network). Optionally, the data transfer path 14 contains data memories (not explicitly depicted here) for temporarily or permanently storing the data transferred between the computed tomography scanner 5 and the work computer 3.

In a process preceding the core of the method according to the invention, a volume data record V is recorded by means of the computed tomography scanner 5. To this end, the object 10 borne on the rotary plate 9 is rotated about the axis 8 and, in the process, irradiated by x-ray radiation R (more precisely: an x-ray cone beam) by means of the x-ray source 6. Here, a multiplicity of projection images P which show the object 10 at different projections across the axis 8 are recorded by means of the x-ray detector 11 arranged opposite to the x-ray source 6 under continued rotation of the object 10.

The projection images P are supplied to the control computer 12. The control software 13 there calculates the volume data record V from these projection images P using numerical back projection or any other reconstruction algorithm.

In the preferred embodiment of the invention, the control software 13 moreover calculates a surface data record O, the surface points of which reproduce the surface of the object 10 ascertained from the volume data record V, from the volume data record V using one of the surface determination methods set forth at the outset. The volume data record V and the associated surface data record O are supplied to the work computer 3 by the computed tomography scanner 5 by way of the data transfer path 14.

Figure 2:
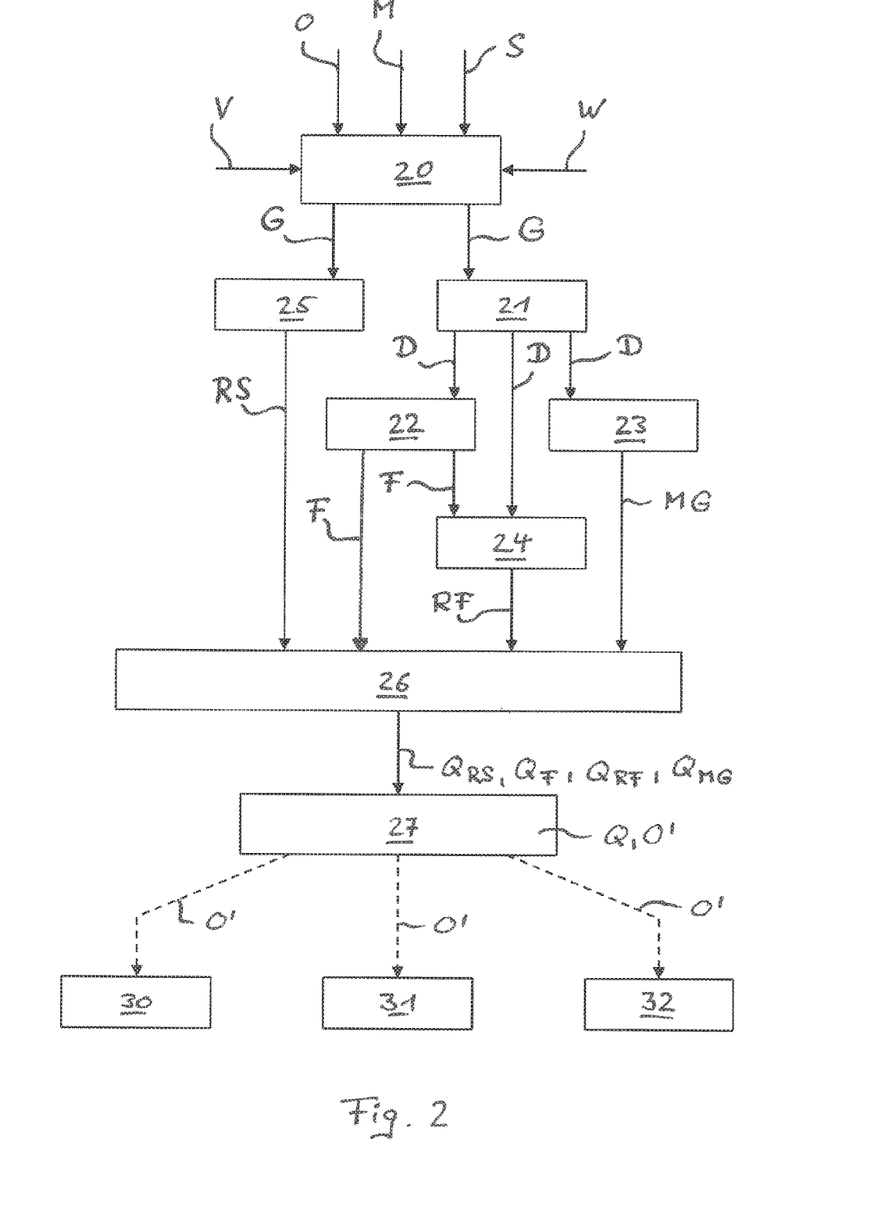
FIG. 2 shows a schematic flowchart of a method carried out by means of the system in accordance with FIG. 1.

A method for determining the quality of the individual surface points of the surface data record O, described in more detail below on the basis of FIG. 2, is carried out in the work computer 3 while running the computer program 2 implemented therein. Here, the volume data record V and the associated surface data record O are supplied to the computer program 2 as input variables for the method. Moreover, as parameters for carrying out the method, the computer program 2 resorts to stated measurements M, which spatially relate the three-dimensional coordinates of the surface data record O to the voxels of the volume data record V. Hence, using the stated measurements M, the computer program 2 is put into the position of correlating each surface point of the surface data record O with an associated voxel of the volume data record V which reproduces the same location (spatial point) within the recorded object 10. Furthermore, the computer program 2 resorts to specifications relating to a scanning increment S and specifications relating to a scanning path W as parameters for carrying out the method.

The stated measurements M, the scanning increment S and the scanning path W may be implemented in unchanging fashion in the computer program 2 within the scope of the invention or may be stored in the work computer 3 within the scope of configuration data. As an alternative thereto, provision may also be made for these parameters to be predeterminable in a variable fashion by way of a user interaction. As a further alternative thereto, provision may be made for the stated measurements M to be supplied to the work computer 3 as metadata, e.g. in a header of the surface data record O or of the volume data record V.

On the basis of the input data described above, the computer program 2 ascertains a search beam, i.e. a mathematical straight line designation, in a first step 20 for a specific surface point selected from the surface data record O in such a way that this search beam passes through the considered surface point and, in the process, is perpendicular to the surface defined by the surface points of the surface data record O.

Subsequently, the computer program 2 ascertains a number of spatial points on the basis of the scanning increment S and the scanning path W, said spatial points lying within the spatial volume covered by the volume data record V and the surface data record O in the neighborhood of the considered surface point defined by the search beam. Here, a grayscale value is assigned to each spatial point, said grayscale value being calculated (e.g. by trilinear interpolation) from the grayscale values of the voxels of the volume data record V surrounding the spatial point.

The computer program 2 combines the grayscale values of these voxels to form a grayscale value profile G, as depicted in an exemplary manner in FIG. 3. Hence, specifically, the grayscale value profile G is a grayscale value list (in particular an array within the meaning of software technology) which reproduces the sequence of the grayscale values of the voxels of the volume data record V selected along the search beam.

For the grayscale value profile G ascertained thus, the computer program calculates an associated gradient profile D in a subsequent step 21, said gradient profile representing the mathematical-numerical derivative of the grayscale value profile G along the search beam. The computer program 2 fits a Gaussian function stored as a reference profile to this gradient profile D in a subsequent step 22 using a nonlinear optimization algorithm, in particular the Levenberg-Marquardt algorithm. Moreover, in a step 23, the computer program 2 determines the maximum gradient MG of the grayscale value profile G (corresponding to the maximum of the gradient profile D) from the gradient profile D.

In a step 24, the computer program 2 determines the mean deviation (residues) of this fitted Gaussian function from the gradient profile D on the basis of the gradient profile D and on the basis of the parameters F, determined in step 22, of the fitted Gaussian function.

In parallel with steps 21 to 24, the computer program 2 determines, in a step 25 and from the grayscale value profile G, the deviations (residues) of the grayscale value profile G from a mirror profile derived from the grayscale value profile G by point mirroring.

From the root mean square value RS resulting from step 25, from the parameters F of the Gaussian function fitted in step 22 (in particular from the width of the Gaussian function), from the root mean square value RF, ascertained in step 24, of the fitted Gaussian function from the gradient profile D, and from the maximum gradient MG determined in step 23, the computer program 2 determines respectively one quality characteristic $Q_{RS}$, $Q_F$, $Q_{RF}$ and $Q_{MG}$ in a step 26, wherein these quality characteristics $Q_{RS}$, $Q_F$, $Q_{RF}$ and $Q_{MG}$ each contain a statement about the quality of the considered surface point. In order to ensure comparability of the individual quality characteristics $Q_{RS}$, $Q_F$, $Q_{RF}$ and $Q_{MG}$, these variables are always normalized to a value range between zero and one. Deviating from the simplified illustration in accordance with FIG. 2, where a single quality characteristic $Q_F$ is calculated for the parameters F of the fitted Gaussian function, these parameters F may also be mapped to a plurality of individual quality characteristics.

In a subsequent step 27, the computer program 2 calculates an overall quality characteristic Q from the individual quality characteristics $Q_{RS}$, $Q_F$, $Q_{RF}$ and $Q_{MG}$ by weighted averaging.

The method cycle described above on the basis of steps 20 to 27 is repeated by the computer program 2 for each surface point of the surface data record O. Here, the respectively resulting values of the overall quality characteristic Q are stored in a qualified surface data record O' in this case, said qualified surface data record containing, for each surface point of the surface data record, the three-dimensional coordinates (x, y, z) of the respective surface point and the associated overall quality characteristic Q.

Optionally in each case, the computer program 2 contains one or more of the function modules 30, 31 and 32, described below, by means of which the qualified surface data record O' is displayed or processed further in any other way, either automatically or following a corresponding request by a user of the work computer 3.

Figure 6:
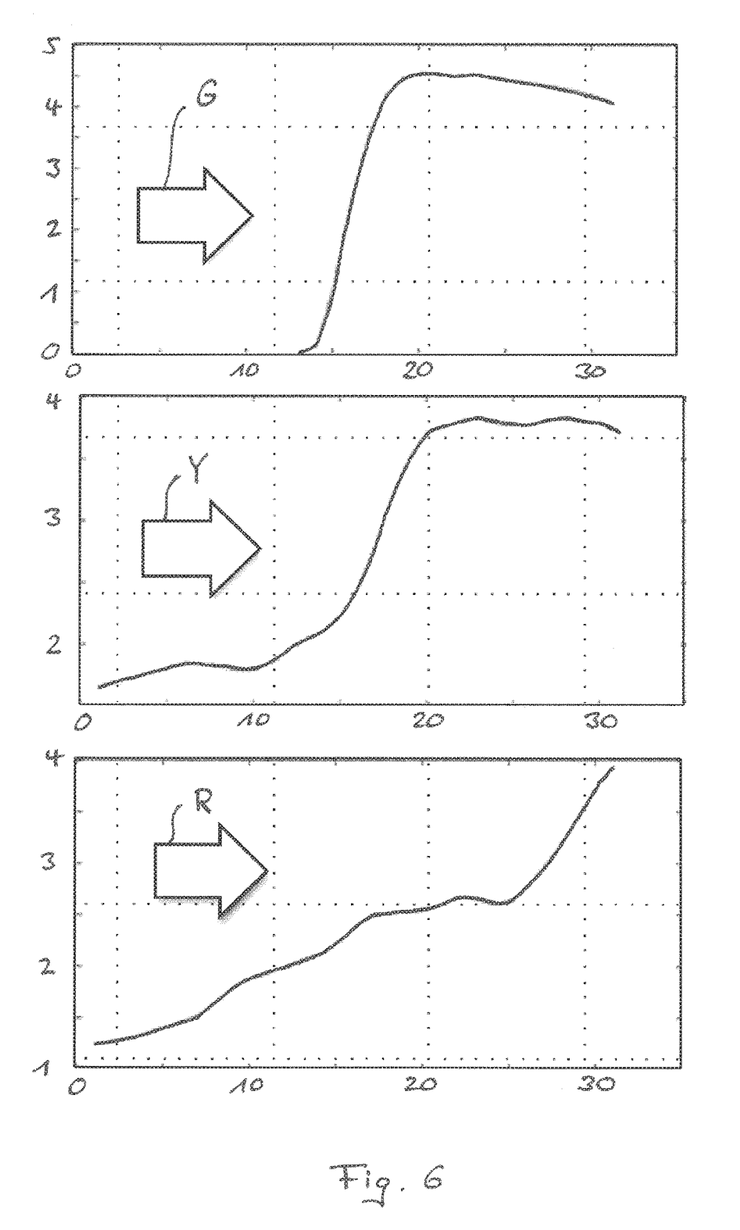
FIG. 6 shows, in three diagrams imaged one above the other, three grayscale value profiles along different search beams through the volume data record in accordance with FIG. 4, with the upper diagram showing the grayscale value curve in the neighborhood of a surface point with a high quality, the middle diagram showing the grayscale value curve in the neighborhood of a surface point with an average quality, and the lower diagram showing the grayscale value curve in the neighborhood of a surface point with a poor quality.

Here, the function module 30 serves for an intuitively understandable display of the qualified surface data record O' including the overall quality characteristics Q contained therein. Within the scope of the function module 30, the overall quality characteristics Q contained in the surface data record O' are initially mapped to associated color values for a false-color display of the surface data record O' on the screen 4 on the basis of a stored color scheme or on the basis of a color scheme which is predeterminable by a user. As described above and elucidated vividly in FIG. 6, the overall quality characteristics Q of the surface data record O' are mapped to one of three colors in the process:

green for surface points with a high overall quality characteristic Q,
yellow for surface points with an average overall quality characteristic Q, and
red for surface points with a poor overall quality characteristic Q.

A corresponding false-color display of the object 10, formed in an exemplary manner by the two metal spheres, is depicted schematically in FIG. 5.

The function module 31 is configured to fit predetermined geometric elements to the surface points of the surface data record O using an optimization algorithm. The overall quality characteristics Q contained in the surface data record O' are included in this fitting process as weighting factors. Surface points whose associated overall quality characteristics Q drop below a predetermined threshold are ignored during the fitting.

Finally, the function module 32 is configured to fit the surface points of the surface data record O' to one or more predetermined geometric elements or a predetermined model (e.g. a CAD model) by means of an affine coordinate transformation (namely, a parameterizable combination of rotation, displacement and scaling of the coordinates of the surface points). In the case of this fitting as well, the overall quality characteristics Q contained in the surface data record O' are included as weighting factors.

The invention becomes particularly clear on the basis of the above-described exemplary embodiment, although it is equally not restricted thereto. Rather, further embodiments of the invention may be derived from the claims and the description above. In particular, step 20 of the method described on the basis of FIG. 2 may be modified to the extent that the computer program 2 ascertains grayscale values within a tangential area instead of a grayscale value profile defined by a search beam, said tangential area being placed against the surface at the respectively considered surface point of the surface data record O. As a criterion for determining the overall quality characteristic Q assigned to the respective surface point, the computer program 2 in this case determines, in particular, characteristics which characterize the homogeneity of the selected grayscale values and the noise of these grayscale values.

LIST OF REFERENCE SIGNS

1 System
2 Computer program
3 Work computer
4 Screen
5 Computed tomography scanner
6 X-ray source
7 Rotary table
8 Axis
9 Rotary plate
10 Object
11 X-ray detector
12 Control computer
13 Control software
14 Data transfer path
20-27 Step
30-32 Function module
V Volume data record
R X-ray radiation
P Projection image
O Surface data record
M Stated measurements
S Scanning increment
W Scanning path
G Grayscale value profile
D Gradient profile
MG (Maximum) gradient F Parameter
RS Root mean square value
RF Root mean square value
$Q_{RS}$ Quality characteristic
$Q_F$ Quality characteristic
$Q_{RF}$ Quality characteristic
$Q_{MG}$ Quality characteristic
Q Overall quality characteristic
O' (Qualified) surface data record

The invention claimed is:

1. A method for ascertaining the inner and outer structures of a recorded object in a nondestructive and contactless manner by determining a local quality of surface data extracted from a volume data record by means of a surface determination method, wherein the volume data record comprises a three-dimensional matrix of voxels which each have a grayscale value assigned thereto, wherein the surface data comprise a number of surface points extracted from the volume data record and wherein, according to the method, the following is carried out for each surface point:

a neighborhood is determined in the volume data record,
at least one quality characteristic is derived from a grayscale value profile of voxels from the neighborhood, said quality characteristic characterizing a quality of a respectively considered surface point, the quality being an information item about an accuracy with which the respectively considered surface point reproduces an actual surface of the object, wherein at least one parameterizable geometric object is fitted to the surface data taking into account the quality characteristics, and wherein the surface data are fitted to at least one geometric element or another surface data record by an affine coordinate transformation taking into account the quality characteristics, and
the quality characteristic, or each quality characteristic, is output together with coordinates of the respectively considered surface point as a method result.

2. The method as claimed in claim 1, wherein a search beam is determined as the neighborhood of the respectively considered surface point in the volume data record, said search beam extending perpendicular to a surface formed by the surface points or in a manner deviating from said perpendicular by up to a certain angle.

3. The method as claimed in claim 2,
wherein a measure for a sharpness of the grayscale value profile and/or a measure for a contrast of the grayscale value profile and/or a measure for a noise of the grayscale value profile and/or a measure for a deviation of the grayscale value profile from a stored reference profile and/or a measure for a symmetry of the grayscale value profile and/or a measure for a monotonic property of the grayscale value profile is/are determined along the search beam as a criterion for the quality of the respectively considered surface point, and
wherein the quality characteristic or at least one of a plurality of quality characteristics is/are derived taking into account the criterion or each criterion.

4. The method as claimed in claim 2,
wherein an alternative point for the surface is determined along the search beam by means of at least one different surface determination method,
wherein a measure for the deviation of the respectively considered surface point from the alternative point, or each alternative point, is used as a criterion for the quality of the respectively considered surface point, and
wherein the quality characteristic or at least one of a plurality of quality characteristics is/are derived taking into account the criterion.

5. The method as claimed in claim 1,
wherein a tangential area is determined in the volume data record as the neighborhood of the respectively considered surface point, said tangential area being tangential to a surface formed by the surface points at the respectively considered surface point.

6. The method as claimed in claim 5,
wherein a measure for a noise and/or a measure for a homogeneity of the grayscale values is/are determined within the tangential area as criterion for the quality of the respectively considered surface point, and
wherein the quality characteristic or at least one of a plurality of quality characteristics is/are derived taking into account the criterion or each criterion.

7. The method as claimed in claim 1, wherein the at least one quality characteristic is derived in parallel with determining the surface data.

8. The method as claimed in claim 1,
wherein the surface data are converted on the basis of one or more assigned quality characteristics into a modified data record which is prepared for display on a screen or in a printout by virtue of modified color values being calculated for the surface points and assigned to the surface points, taking into account the quality characteristics.

9. A system for ascertaining the inner and outer structures of a technical object in a nondestructive and contactless manner by determining the local quality of surface data extracted from a volume data record, wherein the volume data record comprises a three-dimensional matrix of voxels which each have a grayscale value assigned thereto, wherein the surface data comprise a number of surface points extracted from the volume data record, the system comprising:

a computer; and
a non-transitory machine readable data medium storing a program that, when executed by the computer, causes the computer to carry out the following for each surface point:
a neighborhood is determined in the volume data record,
at least one quality characteristic is derived from a profile of the grayscale values of voxels from the neighborhood, said quality characteristic characterizing a quality of a respectively considered surface point, the quality being an information item about an accuracy with which the respectively considered surface point reproduces an actual surface of the object, wherein at least one parameterizable geometric object is fitted to the surface data taking into account the quality characteristics, and wherein the surface data are fitted to at least one geometric element or another surface data record by an affine coordinate transformation taking into account the quality characteristics, and
the quality characteristic, or each quality characteristic, is output together with coordinates of the respectively considered surface point as a method result.

10. A non-transitory machine readable data medium storing a program for ascertaining the inner and outer structures of a technical object in a nondestructive and contactless manner by determining the local quality of surface data extracted from a volume data record, wherein the volume data record comprises a three-dimensional matrix of voxels which each have a grayscale value assigned thereto, wherein the surface data comprise a number of surface points extracted from the volume data record, the program, when executed by a computer, causes the computer to carry out the following for each surface point:

a neighborhood is determined in the volume data record, at least one quality characteristic is derived from a profile of the grayscale values of voxels from the neighborhood, said quality characteristic characterizing a quality of a respectively considered surface point, the quality being an information item about an accuracy with which the respectively considered surface point reproduces an actual surface of the object, wherein at least one parameterizable geometric object is fitted to the surface data taking into account the quality characteristics, and wherein the surface data are fitted to at least one geometric element or another surface data record by an affine coordinate transformation taking into account the quality characteristics, and the quality characteristic, or each quality characteristic, is output together with coordinates of the respectively considered surface point as a method result.

\* \* \* \* \*